United States Patent

[11] 3,599,402

[72] Inventors Robert Albert Heising
Bloomfield;
William Frederick Manns, Ottumwa, both of, Iowa
[21] Appl. No. 11,618
[22] Filed Feb. 16, 1970
[45] Patented Aug. 17, 1971
[73] Assignee Deere & Company
Moline, Ill.

[54] CORN-HEAD-MOUNTING STRUCTURE
7 Claims, 6 Drawing Figs.

[52] U.S. Cl. ................................... 56/2,
56/DIG. 9
[51] Int. Cl. ................................... A01d 73/00,
A01d 45/02
[50] Field of Search ........................ 56/2, 21,
24, 16, 18, DIG. 9

[56] References Cited
UNITED STATES PATENTS
3,270,489 8/1966 Rowweder .................. 56/21
3,425,194 2/1969 Stott et al. .................. 56/DIG. 9
3,491,523 1/1970 Bornzin ...................... 56/2

Primary Examiner—Louis G. Mancene
Assistant Examiner—D. L. Weinhold
Attorneys—H. Vincent Harsha, Harold M. Knoth, William A. Murray and John M. Nolan ABSTRACT: An adapter structure for mounting a combine corn head on the cutterhead housing of a forage harvester. The structure utilizes the available mounting points on the respective units and includes a platelike member substantially enclosing the crop outlet opening of the corn head, the platelike member having an opening in fore-and-aft register with the inlet opening of the forage harvester cutterhead housing. The structure further includes mechanism for driving the operating components of the corn head from a power source on the forage harvester.

PATENTED AUG 17 1971

*INVENTORS*
ROBERT A. HEISING
WILLIAM F. MANNS

INVENTORS
ROBERT A. HEISING
WILLIAM F. MANNS

CORN-HEAD-MOUNTING STRUCTURE

BACKGROUND OF THE INVENTION

The present invention relates generally to corn harvesting equipment, and more particularly to a structure for mounting a corn head on a forage harvester.

When equipped for harvesting corn, a conventional forage harvester includes a cutoff gathering head mounted forwardly of the cutterhead housing which acts to gather the corn in one or more rows, sever the stalks from the ground and feed them rearwardly into the cutterhead housing. The resulting forage is thus a mixture of the relatively high energy ears and the relatively low energy stalks and leaves. A higher energy silage can be produced by feeding the ears along into the forage harvester. This has been accomplished in the past by mounting a hopper on the cutterhead housing in place of the conventional gathering head, and feeding ears, which have already been picked, into the hopper to be reduced by the cutterhead and blown into a silo or other stationary storage structure. This practice has the disadvantage, however, of requiring two separate steps—first, picking the ears, and then chopping them in the forage harvester.

An alternate and preferable method of producing high energy silage is to mount a corn head on the forage harvester, which picks the ears from the stalks and delivers them alone to the cutterhead, thereby consolidating the two steps into one. Although a corn head especially designed to fit a conventional forage harvester could be constructed for this purpose, it is economically desireable to instead utilize a currently available combine corn head. However, most commercially available combine corn heads are designed to be used only with a combine, and therefore are not suitable for use with a forage harvester without substantial modification. For example, the mounting structure on the conventional combine corn head does not match the available mounting structure on the conventional forage harvester, nor does the crop outlet opening in the corn head match the inlet opening in the forage harvester cutterhead housing.

SUMMARY OF THE INVENTION

It is the primary object of the present invention to provide a simple and economical structure for adapting a combine corn head for use on a forage harvester. It is a further object to provide such a structure which utilizes the available mounting points on the respective units.

The invention comprises, generally, a transversely extending, upright, platelike member adapted to be releasably secured to the available mounting points on the rear wall of a commercially available combine corn head and having appropriate mounting brackets on its rear side for releasable mounting on a conventional forage harvester. The platelike member encloses a substantial portion of the crop outlet opening of the corn head, leaving a smaller opening approximately equal in size to the crop inlet opening of the forage harvester cutterhead housing. Further, a transverse drive shaft is journaled on the member to transmit power from an available source on the forage harvester to a drive sprocket on the side of the corn head.

BRIEF DESCRIPTION OF THE DRAWINGS

The preferred embodiment of the present invention is described in conjunction with the accompanying drawings in which.

DESCRIPTION OF THE PREFERRED EMBODIMENT

Figure 1:
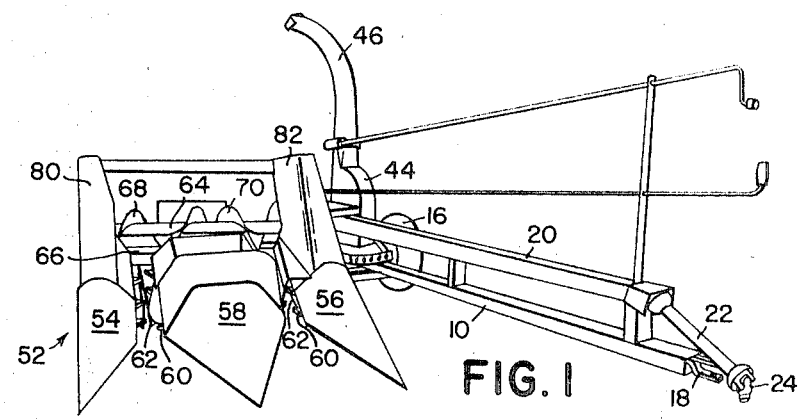
FIG. 1 is a front perspective view of a forage harvester with the adapter structure and corn head mounted thereon.

In the following description, right- and left-hand reference is determined by standing at the rear of the forage harvester and facing the direction of travel.

The forage harvester illustrated includes an L-shaped frame structure having a generally fore-and-aft draft member 10 and a rear transverse portion indicated generally at 12. The frame is supported relative to the ground on right and left ground wheels 14 and 16, respectively, carried outwardly of the respective sides of the transverse frame portion 12. A clevis 18 adapted to receive the tractor drawbar is fixed to the forward end of the draft member 10. Mounted above and parallel to the member 10 is an inverted U-shaped shield 20 which encloses a drive shaft extending the entire length of the member 10 to a gear case on the transverse frame 12. A short telescoping shaft 22 is connected to the forward end of the drive shaft through a conventional universal joint, and in turn is provided with a universal joint 24 on its forward end for connection with the tractor power driven shaft. Suitable drive mechanism (not shown) drivingly connects the output shaft of the gear case with the various driven components on the harvester.

Figure 2:
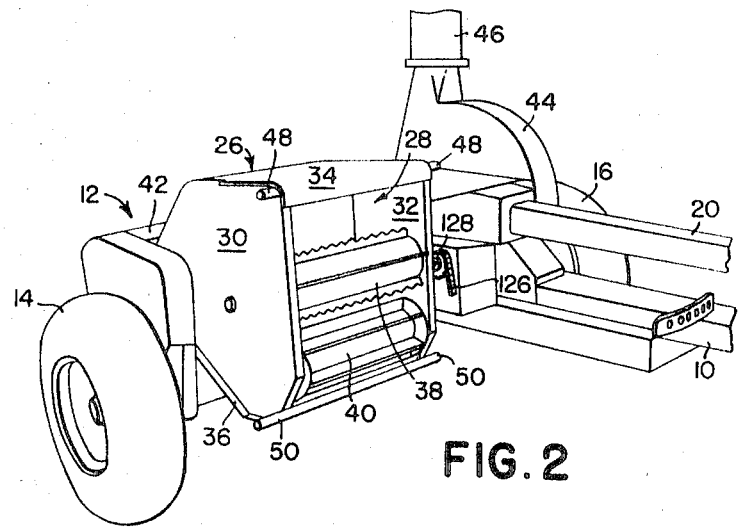
FIG. 2 is a somewhat enlarged partial perspective view of the forage harvester with the corn head and adapter structure removed.
Figure 3:
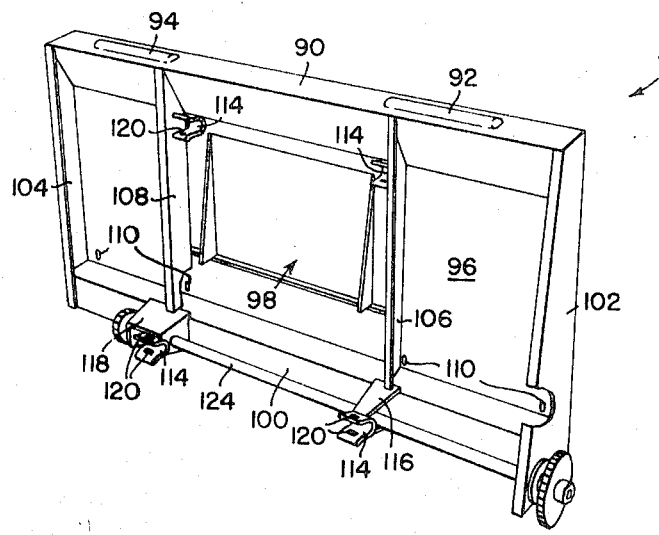
FIG. 3 is a view of the adapter structure taken from the right rear.

Mounted on the transverse frame portion 12 is a conventional cylindrical cutterhead (not shown) contained within a housing 26 having a forward crop inlet opening 28. The housing includes a pair of upright side walls 30 and 32, a top plate 34 and a bottom plate 36. As shown in FIG. 2, a pair of upper and lower feed rolls 38 and 40, respectively, which cooperate to feed the harvested material rearwardly to the cutterhead, are journaled in the sidewalls just rearwardly of the crop opening 28. The cutterhead reduces the material and again delivers it rearwardly to a transverse auger contained within a housing 42, the auger delivers it laterally to a rotary blower 44 on the left side of the frame portion 12, and the blower, in turn, propels it upwardly into a curved discharge spout 46 which directs it into an appropriate storage container, such as a trailing wagon.

A forage harvester equipped for harvesting corn silage is conventionally fitted with a cutoff gathering head, such as that shown in U.S. Pat. No. 3,438,182 to Kessler, issued Apr. 15, 1969. To accommodate such a gathering head, the housing 26 is provided with upper and lower transverse mounting pins 48 and 50, respectively, which extend outwardly from the sidewalls 30 and 32. As shown in the aforementioned patent, the conventional gathering head is provided with an appropriate bracket and fastening means for releasably mounting the head on the pins 48 and 50.

A silage of higher feed value than that obtained under the conventional method can be produced by fitting the forage harvester instead with a picker-type corn head, such as that commonly used on a combine, which strips the ears from the stalks and leaves the latter in the field. Such a corn head, indicated generally by the numeral 52, is shown mounted on the forage harvester in FIG. 1 and includes a forward sheet metal structure comprising right and left, forwardly extending snout portions 54 and 56, respectively, and a center snout portion 58, which conjunctively define a pair of fore-and-aft corn row receiving passages. The portions 54, 56 and 58 act to lift any fallen stalks and guide them into the fore-and-aft passages. Associated with each passage is a set of gathering chains 60 and a pair of snapping rolls 62, which operate in a well known manner to strip the ears from the stalks and carry them upwardly and rearwardly to a transverse auger 64. The auger 64 operates above a trough 66, and is provided with right and left, oppositely wound flights 68 and 70 on its respective ends, which, when the auger is rotated, carry the ears from both rows centrally.

As previously noted, the corn head attachment 52 is of the type conventionally used in conjunction with a combine, and is adapted to be mounted on the forward end of a combine feeder house in a manner similar to that disclosed is U.S. Pat. No. 3,270,489 to Rohweder, issued Sept. 6, 1966. The present invention resides in means for mounting the corn head 52 on the forage harvester, utilizing the available mounting structure on each unit, and consists generally of an adapter structure indicated in its entirety by the reference numeral 72, means for mounting the corn head attachment 52 on the adapter structure 72, and means for mounting the adapter structure on the cutterhead housing.

Figure 4:
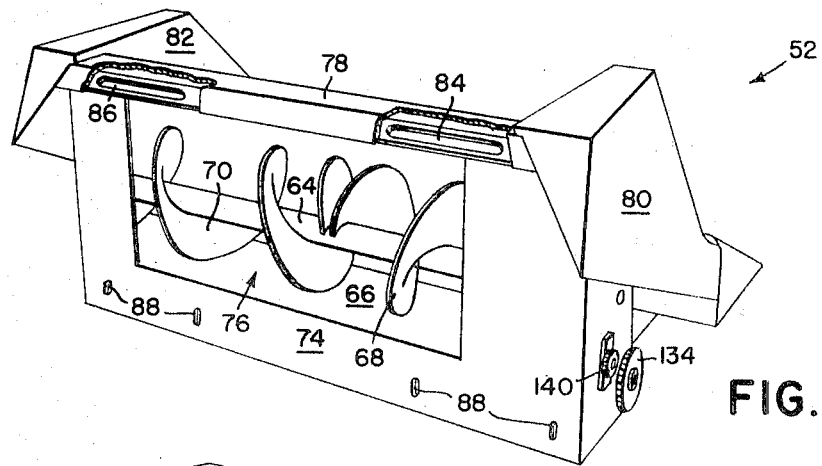
FIG. 4 is a right rear view of the corn head attachment on the same scale as FIG. 3.

As shown from the rear in FIG. 4, the corn head attachment 52 includes a transverse, generally upright rear wall 74 having a crop outlet opening 76. The upper boundary of the opening 76 is formed by a transverse structural beam member 78 extending between right and left side portions 80 and 82 of the attachment. The beam 78 projects rearwardly from the wall 74, and as shown in cutaway in FIG. 4, is provided with a pair of elongated upwardly opening recesses 84 and 86 in its bottom surface. Additional mounting means are provided in the form of elongated slots 88 spaced transversely along the lower edge of the wall 74.

Figure 5:
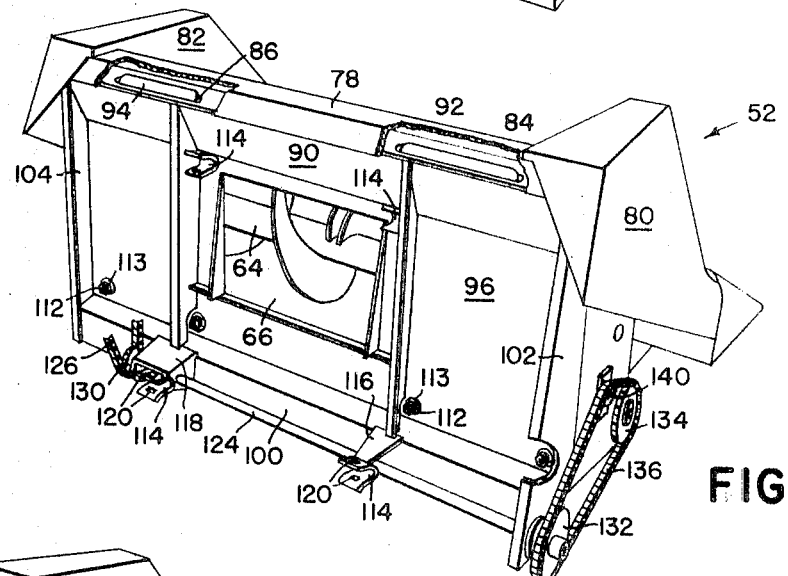
FIG. 5 is a view similar to FIG. 4 showing the adapter structure mounted on the corn head attachment.

The structure 72 is adapted to mount on the rear wall of the attachment 52 and comprises a transverse upper beam member 90 having a pair of elongated projections 92 and 94 on its upper edge adapted to be received in the respective recesses 84 and 86 in the beam 78, as shown in cutaway in FIG. 5. The adapter structure further includes a transverse upright wall 96 having a crop transfer opening 98 therein, a lower transverse structural beam 100, a pair of vertical structural members 102 and 104 connecting the respective ends of the transverse beams 90 and 100, and an additional pair of vertical supports 106 and 108 connecting the transverse beams just outwardly of the sides of the crop opening 98.

When the adapter structure 72 is mounted on the corn head attachment, as shown in FIG. 5, the upper surface of the transverse beam 90 is disposed flush against the lower surface of the transverse beam 78 in the attachment 52, and the projections 92 and 94 on the upper surface of the beam 90 are received respectively in the recesses 84 and 86 on the lower surface of the beam 78, thereby forming a readily connectable and disconnectable means. Additional disconnectable means are provided in the form of a plurality of elongated slots 110 along the lower edge of the wall 96 in fore-and-aft register with the slots 88 in the rear wall 74 of the attachment, for receiving suitable disconnectable fastener means such as bolts 112, each bolt having an associated nut 113. When mounted in this manner, the wall 96 of the structure 72 fits tightly against the rear wall 74 of the attachment, thus closing off a substantial portion of the opening 76 and forming a crop tight seal between the walls 74 and 96.

Figure 6:
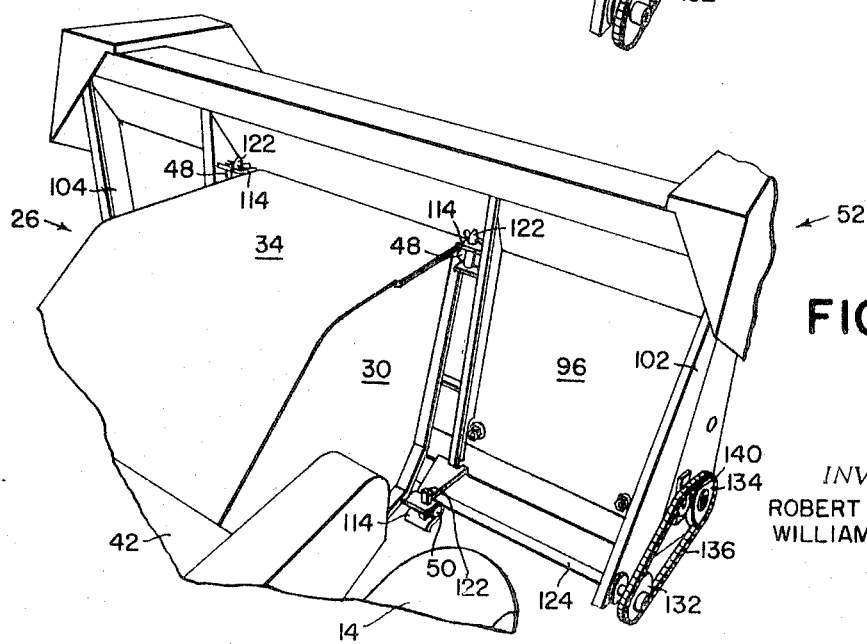
FIG. 6 is a partial view taken from the right rear showing the corn head and adapter structure mounted on the forage harvester.

The rear side of the structure 72 is provided with an upper and lower pair of rearwardly opening U-shaped brackets 114, the upper pair being mounted on the inner sides of the vertical support members 106 and 108 just above the opening 98, and the lower pair being mounted rearwardly of the lower beam 100, on support brackets 116 and 118, which, in turn, are fixed to the rear surface of the beam 100. As shown in FIG. 6, the brackets 114 are adapted to receive the transverse upper and lower mounting pins 48 and 50, respectively, extending outwardly from the cutterhead housing 26 on the forage harvester. A pair of vertically aligned apertures 120 are provided in the legs of each of the brackets 114 for receiving pins 122, which act to releasably retain the adapter structure 72 on the mounting pins 48 and 50. It is apparent from FIG. 6 that when the adapter structure and corn head attachment are mounted on the forage harvester, the opening 98 in the wall of the attachment is in fore-and-aft register with the crop inlet opening 28 of the cutterhead housing, and the harvested crop fed centrally by the auger 64 is thus directed between the feed rolls 38 and 40 in the housing.

A transverse drive shaft 124 is disposed adjacent the rear wall of the lower transverse beam 100 of the structure 72, and is journaled at its left and right ends, respectively, in the support bracket 118 and the lower portion of the vertical structural member 102. A roller chain 126, shown partially in FIGS. 2 and 5, drivingly connects a driven sprocket 128 on the forage harvester with an aligned sprocket 130 on the left end of the shaft 124, and a sprocket 132 on the right end of the shaft is, in turn, drivingly connected to a sprocket 134 on the right side of the attachment 52 through a second roller chain 136. An idler sprocket 140 on the side of the attachment is adjustable to maintain the proper running tension in the chain 136. The sprocket 134, in turn, drives the opening components of the attachment through an appropriate drive mechanism.

We claim:

1. In combination, a forage harvester having a mobile frame; a cutterhead housing carried by the frame and having a forward crop inlet opening; a corn head disposed forwardly of the housing including a rear wall having a crop outlet opening in fore-and-aft register with and substantially larger than the inlet opening in the cutterhead housing; an adapter structure interposed between the corn head and the cutterhead housing enclosing a substantial portion of the crop outlet opening in the rear wall of the corn head and having a crop transferring opening in fore-and-aft register with the respective openings in the cutterhead housing and the corn head rear wall; first releasable connection means between the cutterhead housing and the adapter structure; and second releasable connection means between the corn head and the adapter structure.

2. The combination described in claim 1 wherein said first connection means comprises: upper and lower transverse mounting pins extending outwardly from the cutterhead housing adjacent the crop inlet opening; upper and lower, rearwardly opening U-shaped brackets on the adapter structure engageable with said mounting pins; and means for releasably securing the brackets on said pins.

3. The combination described in claim 1 wherein the second connection means comprises: an upwardly opening socket means on the corn head; an upwardly projecting socket-engaging means on the adapter structure for engagement with and disengagement from the socket means; and additional disconnectable fastener means between the corn head and the adapter structure spaced vertically from the socket means.

4. The combination described in claim 1 further including power transmission means on the adapter structure operably connecting a power source means on the forage harvester with a power input means on the corn head.

5. In combination, a forage harvester having a mobile frame; a cutterhead housing carried by the frame and having a forward crop inlet opening; upper and lower transverse mounting pins fixed to and extending outwardly from said housing; an upright, transversely extending adapter structure disposed forwardly of the housing and having a crop transferring opening in fore-and-aft register with the inlet opening in the housing; upper and lower, rearwardly opening U-shaped brackets on the rear of the adapter structure engageable with said mounting pins; means releasably securing the brackets on said pins; a corn head disposed forwardly of the adapter structure including an upright, transversely extending rear wall having a crop outlet opening in fore-and-aft register with the openings in the adapter structure and cutterhead housing, respectively; an upwardly opening socket means on the corn head; an upwardly projecting socket-engaging means on the adapter structure for engagement with and disengagement from the socket means; and additional disconnectable fastener means between the corn head and the adapter structure spaced vertically from the socket means.

6. The combination described in claim 5 wherein the crop outlet opening in the rear wall of the corn head is substantially larger than the inlet opening in the cutterhead housing; and the adapter structure encloses a substantial portion of the outlet opening.

7. The combination described in claim 5 further including power transmission means on the adapter structure operably connecting a power source means on the forage harvester with a power input means on the corn head.